US010122180B2

United States Patent
Neuhaus et al.

(10) Patent No.: US 10,122,180 B2
(45) Date of Patent: Nov. 6, 2018

(54) BUS CONDITIONER FOR AN AIRCRAFT POWER SYSTEM

(71) Applicant: Parker-Hannifin Corporation, Cleveland, OH (US)

(72) Inventors: Donald Neuhaus, Smithtown, NY (US); Velimir Nedic, Huntington Beach, CA (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 371 days.

(21) Appl. No.: 14/878,454

(22) Filed: Oct. 8, 2015

(65) Prior Publication Data

US 2016/0105030 A1 Apr. 14, 2016

Related U.S. Application Data

(60) Provisional application No. 62/061,247, filed on Oct. 8, 2014.

(51) Int. Cl.
| | |
|---|---|
| *G05D 3/12* | (2006.01) |
| *H02J 5/00* | (2016.01) |
| *G06F 13/42* | (2006.01) |
| *G06F 1/26* | (2006.01) |
| *H02J 3/32* | (2006.01) |
| *H02J 4/00* | (2006.01) |

(52) U.S. Cl.
CPC .............. *H02J 5/00* (2013.01); *G06F 1/263* (2013.01); *G06F 13/4282* (2013.01); *H02J 3/32* (2013.01); *H02J 4/00* (2013.01); *B64D 2221/00* (2013.01); *Y02B 60/1228* (2013.01); *Y02B 60/1235* (2013.01); *Y02D 10/14* (2018.01); *Y02D 10/151* (2018.01)

(58) Field of Classification Search
CPC .......................................................... H02J 5/00
USPC .................................................. 700/275-298
See application file for complete search history.

(56) References Cited

U.S. PATENT DOCUMENTS

| | | | |
|---|---|---|---|
| 6,487,096 B1 * | 11/2002 | Gilbreth | .................... H02J 1/10 363/35 |
| 6,559,621 B2 | 5/2003 | Corless et al. | |
| 7,692,331 B2 | 4/2010 | Langlois et al. | |
| 7,986,057 B2 | 7/2011 | Ganev et al. | |

(Continued)

OTHER PUBLICATIONS

Patrice Simon & Yury Gogotsi, "Materials for electrochemical capacitors", Nature Materials 7, 2008, pp. 845-854 (Year: 2008).*

(Continued)

*Primary Examiner* — Satish Rampuria
(74) *Attorney, Agent, or Firm* — Renner Otto Boisselle and Sklar (57) ABSTRACT

A bus conditioner for an electrical power system having at least one bus couplable to an electric power generation device driven by a prime mover includes a first energy storage device, a bi-directional power converter including a first converter input electrically connected to the first energy storage device and a converter output for connection to the bus, and a controller operatively coupled to the bi-directional power converter. The controller is configured to maintain a substantially constant load on the power generation device by commanding the power converter to divert excess power into the first energy storage device or use energy from the first storage device to provide power to the bus.

19 Claims, 5 Drawing Sheets

(56) References Cited

U.S. PATENT DOCUMENTS

| | | | | |
|---|---|---|---|---|
| 2002/0171397 | A1* | 11/2002 | Adrian | H01M 6/5033 |
| | | | | 320/119 |
| 2006/0061922 | A1 | 3/2006 | Mihai et al. | |
| 2008/0058998 | A1* | 3/2008 | Breit | H02J 3/14 |
| | | | | 700/295 |
| 2009/0302153 | A1* | 12/2009 | Matasso | B64C 13/50 |
| | | | | 244/99.2 |
| 2010/0102625 | A1* | 4/2010 | Karimi | B60L 1/00 |
| | | | | 307/9.1 |
| 2014/0084817 | A1* | 3/2014 | Bhavaraju | B60L 11/005 |
| | | | | 318/139 |

OTHER PUBLICATIONS

Emadi, K., and M. Ehsani. "Aircraft power systems: technology, state of the art, and future trends." IEEE Aerospace and Electronic Systems Magazine 15.1 (2000): pp. 28-32. (Year: 2000).*

Batzel, Todd D., and David C. Swanson. "Prognostic health management of aircraft power generators." IEEE Transactions on Aerospace and Electronic Systems 45.2 (2009).pp. 473-483 (Year: 2009).*

Nilsson, Julia, and Lina Bertling. "Maintenance management of wind power systems using condition monitoring systems—life cycle cost analysis for two case studies." IEEE Transactions on energy conversion 22.1 (2007): pp. 223-229. (Year: 2007).*

* cited by examiner

BUS CONDITIONER FOR AN AIRCRAFT POWER SYSTEM

RELATED APPLICATION DATA

This application claims priority of U.S. Provisional Application No. 62/061,247 filed on Oct. 8, 2014, which is incorporated herein by reference in its entirety.

TECHNICAL FIELD

The present disclosure relates generally to aircraft power systems, and more particularly to a bus conditioner for use with aircraft power systems.

BACKGROUND

Aircraft and propulsion (gas turbine engines) power system architecture has been heading for major changes. A dominant trend in advanced aircraft power systems is increasing use of electric power to drive aircraft and propulsion subsystems that, in conventional aircraft, have been driven by a combination of mechanical, electrical, hydraulic, and pneumatic systems.

A trend is to replace more engine-driven mechanical, hydraulic, and pneumatic loads with electrical loads to enhance system performance and reliability. More particularly, electrical subsystems may require lower engine power and operate at higher efficiency relative to conventional mechanical, hydraulic, and pneumatic systems, but they also can be used only as needed.

SUMMARY

An aircraft bus conditioner in accordance with the present disclosure includes at least one of a high power energy storage device (ESD) and a high energy ESD, and a bi-directional power converter (e.g., an inverter or other power converter) electrically connected to the at least one ESD. The ESD, for example, may have a battery-capacitor, battery-battery (different types) or battery-flywheel configuration. The bi-directional power converter provides an interface between the bus and the storage devices and enables bi-directional power flow between the ESD and the power distribution bus. A controller operates the power converter to maintain a substantially constant load on an electric power generation device that supplies electric power to the bus by storing energy from the bus in the ESD during periods of low power demand and using energy stored in the ESD to provide power to the bus during periods of high power demand.

The bus conditioner in accordance with the present disclosure enhances integration of existing and future power system sources and loads by using an energy storage system. Two or more energy storage device technologies can be combined to meet operational power and energy requirements with the goal of smoothing the bus, power, current and/or voltage in order to increase engine efficiency. More particularly, the bus conditioner eases stress on the power system and "smoothes" the engine loading, thereby increasing the overall efficiency of the engine.

According to one aspect of the invention, a bus conditioner for an electrical power system having at least one bus couplable to an electric power generation device driven by a prime mover, including: a first energy storage device; a bi-directional power converter including a first converter input electrically connected to the first energy storage device and a converter output for connection to the bus; and a controller operatively coupled to the power converter, the controller configured to maintain a substantially constant load on the power generation device by commanding the power converter to divert excess power into the first energy storage device or use energy from the first storage device to provide power to the bus.

In one embodiment, the first energy storage device comprises a battery.

In one embodiment, the battery comprises a lithium-ion battery.

In one embodiment, the power converter further includes: a second converter input for connection to a second energy source; and a second energy storage device electrically connected to the second converter input.

In one embodiment, the controller is configured to command the power converter to use energy stored in at least one of the first or second energy storage devices to provide power to the at least one bus or use power on the bus to store energy in at least one of the first or second energy storage devices.

In one embodiment, the second energy storage device comprises a capacitor.

In one embodiment, the capacitor comprises an electrochemical capacitor.

In one embodiment, the second energy storage device comprises a flywheel.

In one embodiment, the controller includes a first input for receiving a bus voltage, a second input for receiving a bus current, and a third input for receiving a reference power setpoint.

In one embodiment, the controller is configured to regulate a power level on the bus based on a bus voltage, a bus current and a power reference as provided on the first input, second input and third input, respectively.

In one embodiment, the controller is configured to calculate a load on the bus based on the bus voltage and bus current, and when the calculated load is less than a first prescribed level the controller is configured to divert power from the bus into at least one of the first energy storage device or the second energy storage device.

In one embodiment, the controller is configured to calculate a load on the bus based on the bus voltage and bus current, and when the calculated load is greater than a second prescribed level the controller is configured to use energy stored at least one of the first energy storage device or the second energy storage device to provide power to the bus.

In one embodiment, the controller is configured to: determine a load on the bus; command the power converter to provide energy to the bus upon the determined load being greater than a first prescribed value; and command the power converter to absorb energy into at least one of the first or second energy storage devices upon the determined load being less than a second prescribed value.

In one embodiment, the controller is configured to: calculate an average power delivered by the bus; and command the power converter to regulate load variations on the bus based on the calculated average power.

In one embodiment, the controller is configured to: calculate at least one of an average voltage or an average current delivered by the bus; and command the power converter to regulate load variations on the bus based on the calculated average voltage or average current.

In one embodiment, the controller is configured to: determine an energy demand on the bus; divide the energy demand into low-frequency components and high-frequency components; use the first energy storage device to store or supply low-frequency components; and use the second energy storage device to store or supply the high-frequency components.

In one embodiment, the controller is configured to pro-actively release energy to the bus prior to an impending load increase.

According to another aspect of the invention, an aircraft power system includes: an electrical generator configured to generate DC power; at least one distribution device electrically connected to the electrical generator, the distribution device including a first and second terminals electrically connected to the electrical generator; and the bus conditioner described herein, wherein the bus conditioner is electrically connected to the first and second terminals.

According to another aspect of the invention, a method of improving engine efficiency for an engine drivably coupled to an electric power generation device includes maintaining a substantially constant load on the power generation device by providing energy from a first energy storage device to the bus or storing energy from the bus in the first energy storage device.

In one embodiment, maintaining includes calculating at least one of a current setpoint or a voltage setpoint for determining when to provide energy to the bus and when to store energy from the bus, the current setpoint based on an average current provided by the electric power generation device to the bus over a predetermined time period, and the voltage setpoint based on an average voltage provided by the electric power generation device to the bus over the predetermined time period.

In one embodiment, maintaining a substantially constant load includes using a first energy storage device and a second energy storage device different from the first energy storage device, the first energy storage device having a higher energy storage density than the second energy storage device, and the second energy storage device having a higher power density than the first energy storage device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Many aspects of the invention in accordance with the present disclosure can be better understood with reference to the following drawings. The components in the drawings are not necessarily to scale, emphasis instead being placed upon clearly illustrating the principles in accordance with the present disclosure. Likewise, elements and features depicted in one drawing may be combined with elements and features depicted in additional drawings. Additionally, in the drawings, like reference numerals designate corresponding parts throughout the several views.

DETAILED DESCRIPTION

Future military fighter air vehicles, configured for high speeds, high energy weapons, and high maneuverability (high power) flight controls actuation, will need to adopt new technologies to remain state-of-the art aircraft. However, the dynamic, bi-directional load profile (flight controls actuation) in advanced air vehicle electric power system architecture places great stress on the aircraft electric power system components and can contribute to a reduction in both power quality and overall system reliability. The addition of next-generation systems may unduly tax the existing power system resulting in unreliable operation.

Aircraft engine efficiency improves when the power draw on components powered by the engine (e.g., electric generation devices) is relatively smooth, i.e., free of power spikes (e.g., voltage and/or current spikes), transients, and the like. A bus conditioner in accordance with the present disclosure can stabilize power draw on the engine-driven electric generation devices, thereby enabling system upgrades without overly burdening the existing aircraft power system. In other words, the bus conditioner in accordance with the present disclosure can maintain a substantially constant load on the engine-driven electric generator that provides power to the bus, thereby providing a substantially constant load to the engine. As used herein, a substantially constant load refers to relatively constant peak (positive and/or negative) to average power ratios, e.g., 1.5:1 or 2:1 ratios. The bus conditioner in accordance with the present disclosure can significantly minimize the operational limits and constraints experienced with existing and potentially future air dominance fighters.

The bus conditioner includes at least one and preferably two energy storage devices (ESDs) having variable charge/discharge rates, and a bi-directional power electronics converter (e.g., a DC-DC converter, an inverter, or other power converter). In one embodiment, the bus conditioner is configured to store electrical energy in a high energy ESD (e.g., high storage capacity, but slow response) and high power density ESD (e.g., low storage capacity, but fast response rate). The ESDs and power converter are combined to meet operational transient power and energy requirements of the power system with the goal of smoothing the bus voltage to provide a stable load on the engine (and thus increase engine efficiency). While capacitive and battery energy storage devices are described herein, it should be appreciated that any type of energy storage device may be used depending on the specific application.

Figure 1:
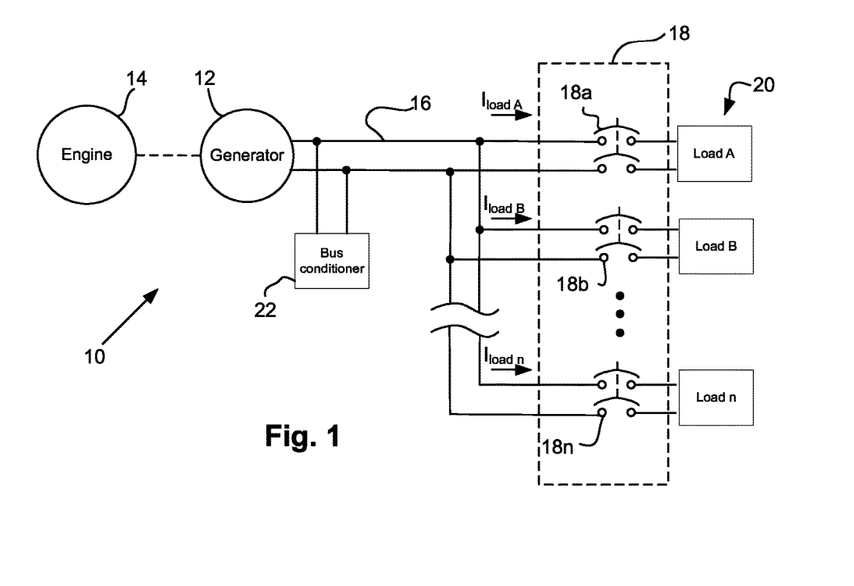
FIG. 1 is a schematic diagram illustrating an exemplary aircraft power distribution system utilizing a bus conditioner in accordance with the present disclosure.

Referring now to FIG. 1, an exemplary aircraft power distribution system 10 in accordance with the present disclosure is illustrated. The power distribution system 10 includes an electric power generation device 12, such as an alternator for generating AC power or a generator for generating DC power. It is noted that while the electric power generation device 12 may provide AC power or DC power, in the exemplary embodiment shown in FIG. 1 the power carried on the bus 16 is DC power. Therefore, use of an alternator as the electric power generation device 12 includes a rectifier circuit (not shown) to transform the AC power to DC power. Such circuit may be formed, for example, using a diode bridge or the like as is known in the art.

The electric power generation device 12 is drivably coupled to an engine 14, such an engine of the aircraft. While the invention is described in the context of an aircraft engine driving a generator, other applications are contemplated. For example, the power system may comprise a fuel cell or other power system that is not driven by a prime mover. A bus 16 electrically couples to the electric power generation device 12 to a distribution panel 18 for distribution of electric power throughout the aircraft. The distribution panel 18 may include a plurality of circuit protectors 18a-18n, each circuit protector protecting a branch circuit from the main bus 16. While the circuit protectors are shown as circuit breakers in FIG. 1, it will be understood that other types of circuit protectors may be utilized, such as fuses or the like, for example. One or more loads 20 are electrically coupled to the distribution panel 18 and receive power from the bus 16.

Electrically connected to the bus 16 is a bus conditioner 22 in accordance with the present disclosure. As will be described in more detail below, the bus conditioner 22 maintains a substantially constant load on the electric power generation device 12 by providing power to the bus 16 during periods of high power demand, and uses excess power on the bus to store energy during periods of low power demand. In this manner, the electric load placed on the electric power generation device 12, and thus the load placed on the engine 14, remains relatively constant thus increasing engine efficiency.

Figure 2:
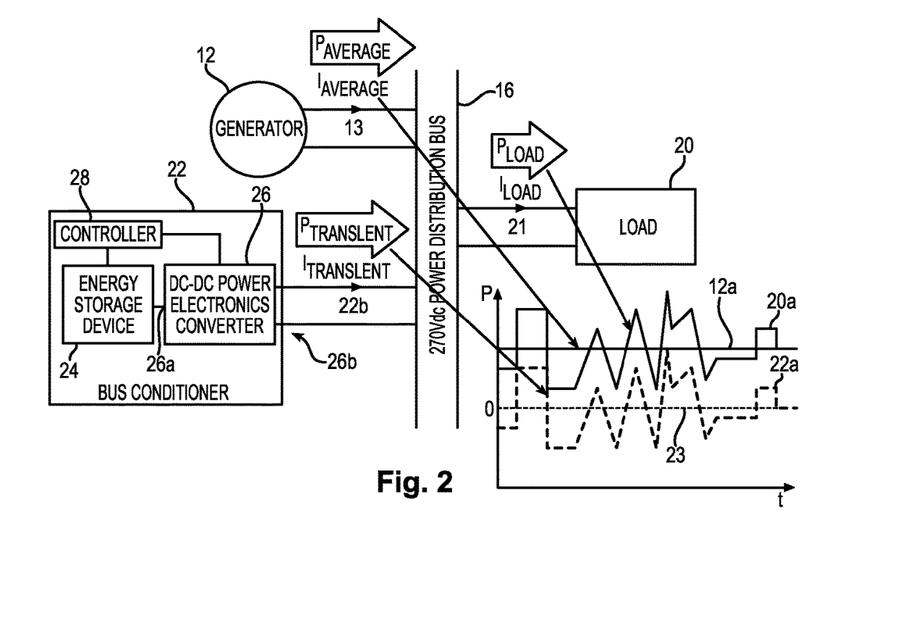
FIG. 2 is a schematic diagram illustrating an exemplary bus conditioner in accordance with the present disclosure coupled to an aircraft power system.

With additional reference to FIG. 2, a schematic diagram of an exemplary bus conditioner 22 in accordance with the present disclosure is illustrated in more detail. Although not shown, it is understood that the electric power generator 12, which provides electric power to the bus 16, is driven by the aircraft engine 14, and a power distribution panel 18 may distribute the power on the bus 16 to other devices/systems.

The bus conditioner 22 includes at least one ESD 24 for storing electrical energy, and a bi-directional power converter 26. In the exemplary embodiment, the ESD 24 may be one or more batteries, such as lithium-ion batteries, batteries with the same or different chemistries, capacitors, flywheels or any other energy storage device that may be used by the specific application. The bi-directional power converter 26 includes a first converter input 26a for connection to the ESD 24, and a converter output 26b for coupling to the bus 16. A controller 28 is operatively coupled to the bi-directional power converter 26 and/or the ESD 24, the controller configured to maintain a substantially constant load on the electric power generation device 12 by commanding the power converter 26 to provide energy from the first ESD 24 to the at least one bus 16 during periods of high power demand and to store energy obtained from the bus 16 in the first ESD 24 during periods of low power demand. The controller 28 may include a processor and memory communicatively coupled via a data bus, and logic stored in the memory and executable by the processor to cause the processor to carry out the functions of the bus conditioner as described herein. Alternatively, the controller 28 may include an application-specific integrated circuit (ASIC) or the like that includes logic configured to carry out the functions of the bus conditioner.

As noted above one or more loads 20 may be connected to the bus 16 and may consume power generated by the electric generating device 12. Exemplary loads 20 include an environment control system for regulating ambient conditions within the aircraft, radar systems, flight actuation systems, direct energy weapons (e.g., a high energy laser), load converters (e.g., a load converting DC power to AC) or any other electrically powered system in the aircraft.

A load current 21 provided to the one or more loads 20 can be divided into two categories, the average or DC component and the transient or AC component. For AC systems there is a similar analogy. As will be discussed in more detail below, to maintain the load on the electric power generation device 12 the bus conditioner 22 shunts a large signal transient current to/from the bus and from/to the ESDs. More particularly, the bus conditioner 22 monitors the bus activity and determines an average or DC load on the electric power generation device 12 ($I_{average}$ 13). When transient current 22b is needed to maintain $I_{average}$ 13 substantially constant, current 22b is circulated through the bus conditioner 22 to the load 20. More specifically, to make up for a current deficit on the bus (e.g., when the load on the bus 16 is greater than a first prescribed value, such as a prescribed power value, voltage value, or current value) the bus conditioner 22 uses energy stored in the energy storage device 24 to provide power to the bus 16. Conversely, if bus loading is below a prescribed value (e.g., when the load on the bus is less than a second prescribed value, such as a prescribed power value, voltage value, or current value), the bus conditioner 22 uses the excess power to store energy in the energy storage device 24, thereby maintaining $I_{average}$ 13 substantially constant.

In one embodiment, the bus conditioner 22 is connected in parallel with the electric power generation device 12 in order to absorb all the dynamic and transient current. In another embodiment, the bus conditioner 22 is integrated in a system close to the dynamically changing and/or pulsating load point. Such configuration enables the bus conditioner to support the transient power as needed by decoupling the dc bus and other loads.

Effectively, the bus conditioner 22 provides a constant (or slowly varying) load on the power generation device 12 and thus on the engine 14. Further, the bus conditioner 22 can improve the transient dynamic response of the power system due to a system bandwidth of the bus conditioner 22 being higher than a system bandwidth of the power generation device 12. Additionally, the bus conditioner 22 helps to maintain DC bus stability.

In regulating the load on the bus 16, the controller 28 may determine a setpoint for controlling the power converter 26. In this regard, the controller 28 may calculate an average bus load over a prescribed time period, and use this average load as the bus setpoint. If the power consumed by the load 20 exceeds the bus setpoint value, the controller 28 commands the power converter 26 to use energy stored in the energy storage device 24 to generate power for the bus 16. Conversely, if the power consumed by the load is less than the bus setpoint, the controller 28 commands the power converter 26 to use the excess power for storage in the energy storage device 24. A hysteresis may be incorporated into the controller 28, where in order to supplement the bus power the load current 21 must exceed the setpoint by a first prescribed value (e.g., 1-5%), and in order to store energy in the energy storage device 24 the load current 21 must be below the setpoint by a second prescribed value (e.g., 1-5%).

Operation of the power storage and power consumption cycles can be seen in the graph shown in FIG. 2, which illustrates the average power 12a delivered by the electric power generation device 12 to the bus 16, the power 20a consumed by the load 20, and the power 22a transferred between the bus 16 and the bus conditioner 22. As can be seen, the power 20a consumed by the load 20 varies, at times exceeding the power 12a provided by the electric power generation device 12 and at other times less than the power 12a provided by the electric power generation device 12. During periods in which the power 20a consumed by the load 20 is greater than the power 12a provided by the electric power generation device 12, positive power is provided to the bus, i.e., power 22a flows out of the bus conditioner 22 to the bus 16 to provide additional power required by the load 20. During periods in which the power 20a consumed by the load 20 is less than the power 12a provided by the electric power generation device 12, negative power 22a is provided to the bus 16, i.e., power flows from the bus 16 into the bus conditioner 22 for storage in the energy storage device 24. The positive/negative bus conditioner power flow can be seen by the zero power reference line 23, where values above the line 23 represent positive power flow from the bus conditioner 22 (i.e., power flowing out of the bus conditioner 22 to the bus 16), while values below the line 23 represent negative power flow from the bus conditioner 22 (i.e., power flowing from the bus 16 into the bus conditioner 22). As can be seen in FIG. 2, the waveform for the bus conditioner power 22a corresponds to the waveform for the load power 20a, while the power 12a produced by the electric power generation device 12 remains relatively constant.

Figure 3:
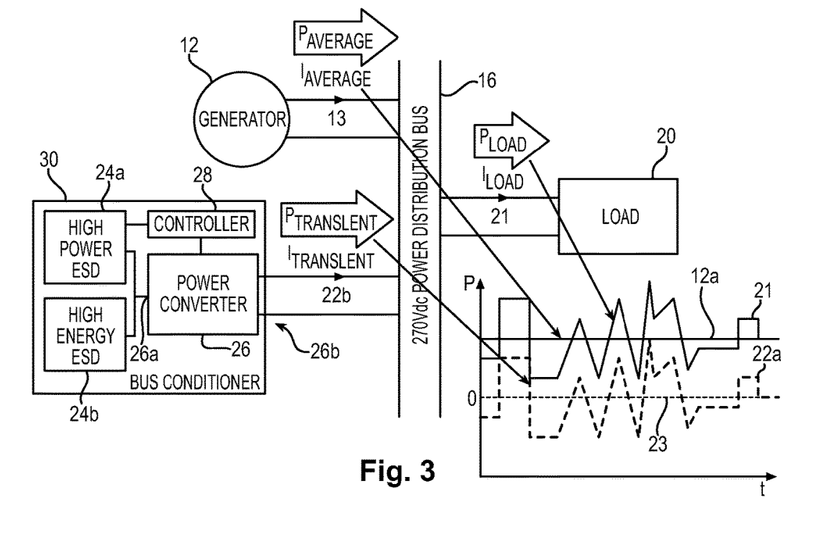
FIG. 3 is a schematic diagram illustrating another exemplary bus conditioner in accordance with the present disclosure coupled to an aircraft power system.
Figure 4:
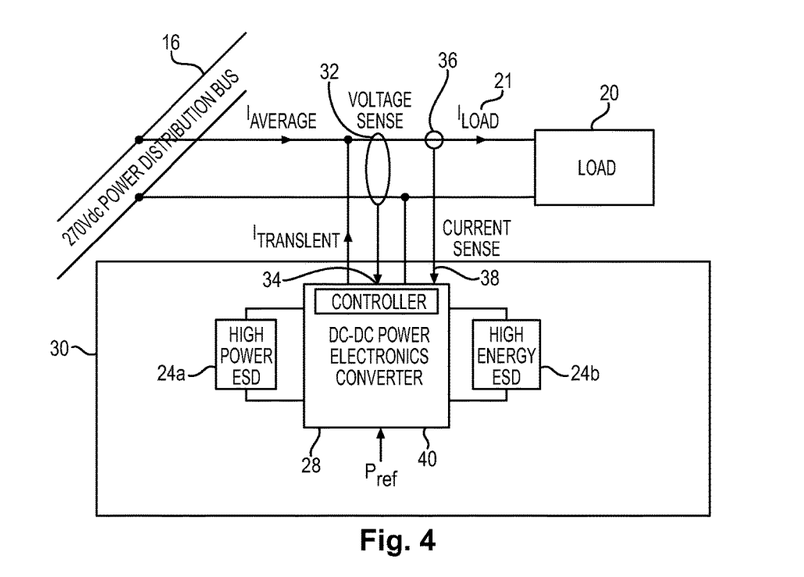
FIG. 4 is a schematic diagram illustrating input/output connections of an exemplary bus conditioner in accordance with the present disclosure.

Referring now to FIGS. 3 and 4, another embodiment of a bus conditioner in accordance with the present disclosure is illustrated. Many components in the embodiment shown in FIGS. 3 and 4 are also shown in FIG. 2 and for sake of brevity like components will not be described here.

The bus conditioner 30 includes a bi-directional power converter 26 and a controller 28 as described above with respect to FIG. 2. However, instead of a single ESD, the bus conditioner 30 includes a first (high energy) ESD 24a and a second (high power) ESD 24b. In one embodiment, the first ESD 24a comprises one or more batteries, such as a lithium-ion batteries or the like, and the second ESD 24b comprises one or more capacitors, such as an electrochemical capacitors or the like.

The first and second ESDs 24a and 24b may be coupled to a common input to the power converter 26 (e.g., they may be connected in parallel). Alternatively, the power converter 26 may include a first converter input for electrical connection to the first ESD 24a, and a second converter input for electrical connection to the second ESD 24b (see FIG. 4). Operation of the bus conditioner 30 is similar to operation of the bus conditioner 22 shown in FIG. 2, except that the bus conditioner 30 may provide from one or both of the ESDs 24a and 24b to provide power to the bus 16 or store power from the bus 16.

Under normal conditions, the electric power generation device 12 provides the average load current (and a stable load to the engine 14). When the load dips below the average (e.g., during transient periods in which the required power is less than the average power), the output of the electric power generation device 12 cannot change instantaneously and while it remains at the preset average value excess power is used to charge the ESDs 24a and 24b (e.g., pulling the excess power generated above the load level off the bus 16). When the load exceeds the average, the output of the electric power generation device 12 again cannot change instantaneously and while it remains at the preset average the bus conditioner 30 uses the energy stored in the ESDs 24a and 24b to provide the additional power needed on the bus 16. In this manner, the output of the electric power generation device (and thus the load on the engine 14) remains relatively constant, thereby enhancing engine efficiency.

In operation, the controller 28 divides the power and energy demand into low-frequency components and high-frequency components. The low-frequency components are supplied by the high energy ESD 24a, and the high-frequency components are supplied by the high power ESD 24b. The sum of the low frequency components and high frequency components in each instant of time are designed to satisfy the power demand, which keeps the load on the power generation device 12 stable. Therefore, while the average power provided by the electric power generation device 12 may vary over time, the variation is much slower and has a significant reduction in the peak variations. As a result, a higher engine efficiency is expected. It should be noted that in this configuration, the bus conditioner does not interfere with the control loop of the main generator.

In the embodiment of FIGS. 3 and 4, the controller 28 is configured to command the power converter 26 to provide energy from at least one of the first or second ESDs 24a and 24b to the at least one bus 16. Additionally, the controller 28 is configured to command the power converter 26 to store energy from the at least one bus 16 in at least one of the first or second ESDs 24a and 24b.

As can be seen in FIG. 4, a voltage sensor 32 measures a voltage on the bus 16 and provides the measured voltage to the controller via a first input 34. Additionally, a current sensor 36 measures a current 21 consumed by the load 20 and provides the measured current to the controller 28 via a second input 38. A power reference signal is also provided to the controller via a third input 40. The power reference signal may be generated by a control device located remotely from the bus conditioner, or it may be a preset value set during system setup. Although not shown, the first, second and third inputs are also applicable to the bus conditioner 22 in FIGS. 1-3. The controller 28 may be configured to regulate a power on the bus 16 based on the measured bus voltage, measured bus current and provided power reference signal. In this regard, the controller 28 may be configured to calculate a power on the bus based on the measured bus voltage and bus current from the electric power generation device 12, and when the calculated power is greater than the power reference signal (a first prescribed power level), the controller 28 commands the power converter 26 to divert power from the bus 16 into at least one of the first ESD 24, 24a or the second ESD 24b. Additionally, when the calculated power is less than a second prescribed power level the controller 28 commands the power converter 26 to divert power from at least one of the first ESD 24, 24a or the second ESD 24b onto the bus 16.

In accordance with one embodiment, control inputs from the energy storage device (e.g., first ESD 24, 24a and/or the second ESD 24b) and/or the bus 16 (e.g., bus voltage, bus current) are utilized to make it possible to proactively begin releasing energy to the bus 16 ahead of a known (heavy) load. This, for example, could be information from a flight control computer or vehicle management computer. Based upon such control inputs, information concerning the upcoming typical load demand can be estimated. This allows the response of the bus conditioner 22, 30 to be tailored before bus variation is detected, providing further enhancements to the power quality of the bus 16.

Figure 5:
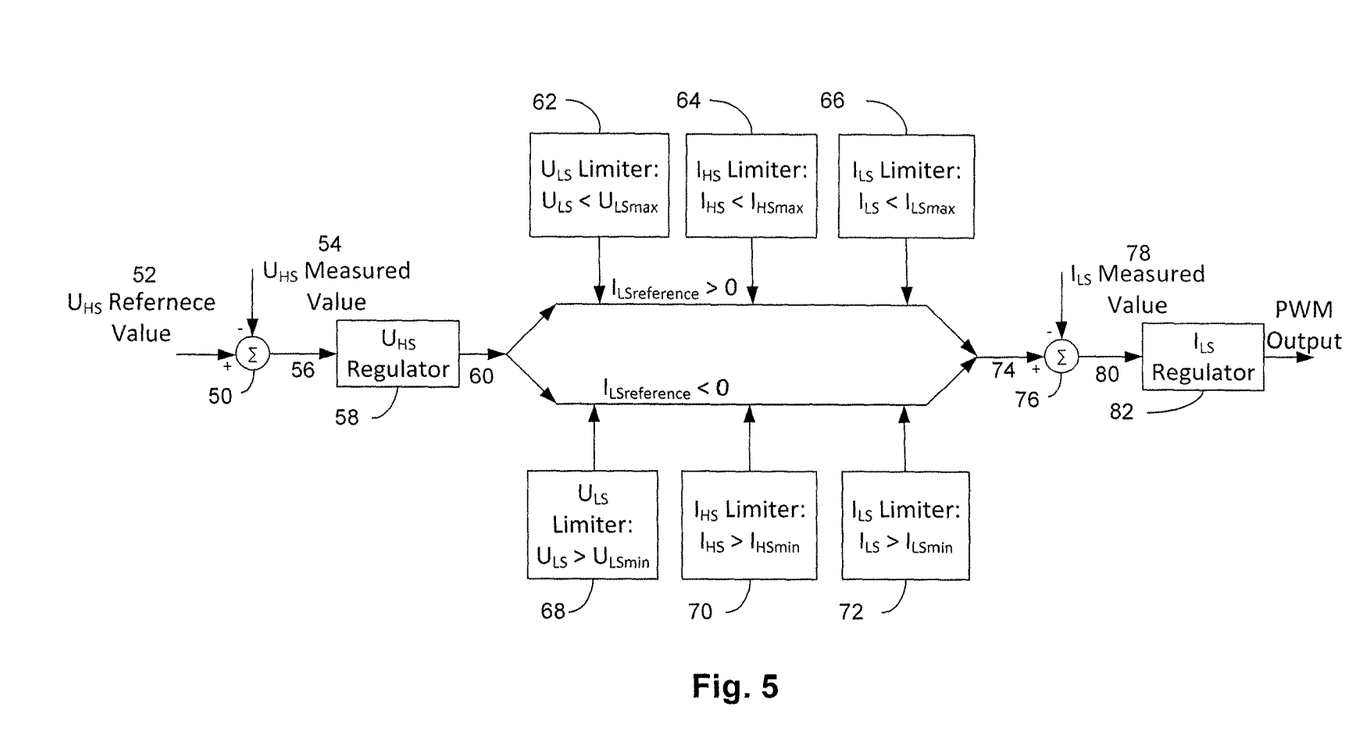
FIG. 5 is a block diagram of an exemplary regulation scheme for a bus conditioner in accordance with the present disclosure.

As an example, the bus conditioner 22, 30 is essentially a current controlled power source and can be configured as a buck-boost structure. In buck mode operation the energy storage device absorbs the energy from the dc bus, while in boost mode operation the energy storage device releases energy back to the bus. A purpose of the bus conditioner 22, 30 is to shunt the transient current to/from an energy storage device that is not directly connected to the bus. The sensed load current can be used to determine the frequency range in which the bus conditioner 22, 30 should respond. In this regard, a current loop generates duty cycles to active switches to produce a desired current. During system transients, the bus conditioner 22, 30 responds to momentarily provide the transient energy to the bus, the bus conditioner's response being limited by the current loop bandwidth or, in other words, the switching frequency. A slower voltage loop can be used to provide additional control on the duty cycles to make up for energy storage device voltage loss and/or gain in transients. An exemplary regulation structure is shown in FIG. 5, which is discussed below. The control is based on traditional proportional-integral (Pp-based phase-shift control where a converter DC power regulator loop is used to set the control value for the current controller. The main control parameter can be the high side voltage, power or current UHS or the low side voltage, power or current ULS depending on the required power flow. In addition, various limiters can be implemented.

More particularly, and with continued reference to FIG. 5, a summing junction 50 receives a bus voltage reference signal 52 that represents a desired voltage on the bus 16. The bus voltage reference signal may be a fixed value stored in memory of the bus conditioner 22, 30 or received from an external device, e.g., an external controller. The summing junction 50 also receives a bus voltage feedback signal 54 representing an actual voltage on the bus 16. The bus voltage feedback signal 54 may be obtained, from example, from voltage sensor 32. The summing junction 50 subtracts the bus voltage feedback signal 54 from the bus voltage reference signal 52 to generate a bus voltage error signal 56, which is provided to an input of a voltage regulator 58.

The voltage regulator 58 may be a conventional voltage regulator, and may include one or more of a proportional controller, an integral controller and/or a derivative controller as is conventional. Based on the error signal 56 received from the summing junction 50 and regulator gains (e.g., proportional gain, integral gain, derivative gain), the voltage regulator 58 generates a correction signal 60 (e.g., a current reference signal) that seeks to minimize the error signal 56 at the output of the summing junction 50. The output of the regulator 58 may be a positive correction or a negative correction, and depending on whether the correction is a positive or negative correction the output of the voltage regulator 58 is provided to one of two different paths.

If the output of the voltage regulator 58 is a positive correction signal (e.g., the current reference 60 is greater than 0), then the current reference 60 is subjected to a plurality of high-level limiters. More particularly, an ESD high voltage limiter circuit 62 compares the actual voltage at the energy storage devices (ESD voltage), which can be obtained from a voltage sensor or the like, to a prescribed maximum ESD voltage. If the actual ESD voltage is less than the prescribed maximum ESD voltage, then the ESD high voltage limiter circuit 62 takes no further action. However, if the actual ESD voltage is greater than or equal to the prescribed maximum ESD voltage, then the current reference 60 as provided at the output of the voltage regulator 58 is limited by the ESD high voltage limiter circuit 62. In this regard, the ESD high voltage limiter circuit 62 overrides output provided by the voltage regulator 58 and prevents the current reference signal from further increasing. The ESD high voltage limiter circuit 62 does not prevent the current reference signal from decreasing.

Next the current reference signal 60 is provided to a bus high current limiter circuit 64. The bus high current limiter circuit 64 seeks to limit the current reference signal 60 provided by the voltage regulator 58 based on the actual current on the bus 16. More particularly, the bus high current limiter circuit 64 compares an actual current supplied by the bus, which may be obtained via a current sensor, to a prescribed maximum bus current. If the actual bus current is less than the prescribed maximum bus current, then no further action is taken by the bus high current limiter circuit 64. However, if the actual bus current is greater than or equal to the prescribed maximum bus current, then the bus high current limiter circuit 64 overrides the output provided by the voltage regulator 58 and prevents the current reference signal 60 from further increasing. The bus high current limiter circuit 64 does not prevent the current reference signal from decreasing.

After the bus current limiter circuit 64, the current reference signal 60 is provided to an ESD high current limiter circuit 66. The ESD high current limiter circuit 66 seeks to limit the current reference signal provided by the voltage regulator 58 based on the actual current drawn from the ESD 24. More particularly, the ESD high current limiter circuit 66 compares an actual current drawn from the ESD 24, which may be obtained via a current sensor, to a prescribed maximum ESD current. If the actual ESD current is less than the prescribed maximum ESD high current, then no further action is taken by the ESD current limiter circuit 66. However, if the actual ESD current is greater than or equal to the prescribed maximum ESD current, then the ESD high current limiter circuit 66 overrides output provided by the voltage regulator 58 and prevents the current reference signal from further increasing. The ESD high current limiter circuit 66 does not prevent the current reference signal 60 from decreasing.

Conversely, if the output of the voltage regulator 58 is a negative correction signal (e.g., the current reference signal 60 is less than 0), then the current reference is subjected to a plurality of low-level limiters. The low-level limiters include an ESD low voltage limier circuit 68, a bus low current limiter circuit 70, and an ESD low current limiter circuit 72. The ESD low voltage limiter circuit 68, bus low current limiter circuit 70, and ESD low current limiter circuit 72 operate similar to their high limiter counterparts, but instead of preventing high currents and voltages, they prevent low currents and voltages. For sake of brevity, operation of the ESD low voltage limier circuit 68, bus low current limiter circuit 70, and ESD low current limiter circuit 72 is omitted.

After the current reference signal 60 generated by the voltage regulator 58 has been conditioned by the respective limiter circuits, the conditioned current reference signal 74 it is provided to a positive input of summing junction 76. A negative input of summing junction 76 receives the actual current on the ESD side of the power converter 28 (ESD current feedback 78—the current flowing out of or into the ESD 24). The ESD current feedback 78 may be obtained, for example, using a current sensor or the like. The summing junction 76 subtracts the ESD current feedback 78 from the ESD current reference 74 to generate an ESD current error signal 80, which is provided to an input of a current regulator 82.

The current regulator 82 may be a conventional current regulator, and may include one or more of a proportional controller, an integral controller and/or a derivative controller as is conventional. Based on the error signal 80 received from the summing junction 76 and regulator gains (e.g., proportional gain, integral gain, derivative gain), the current regulator 82 provides a correction signal that is converted into a PWM output by the power converter 28. In this manner, power is provided from the ESD 24 to the bus 16 or from the bus 16 to the ESD 24.

Figure 6:
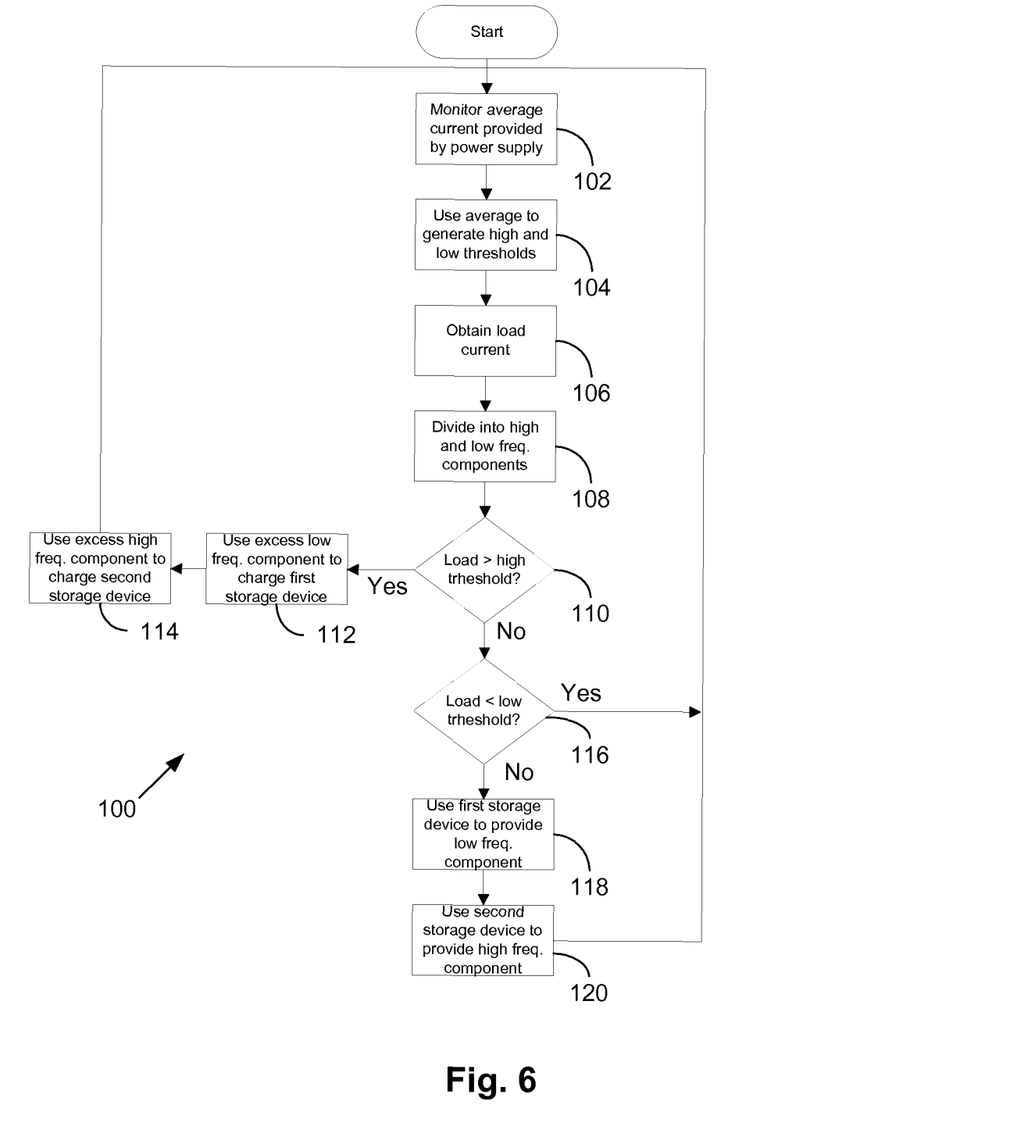
FIG. 6 is a flow chart illustrating exemplary steps for carrying out a method in accordance with an embodiment the present disclosure.

With additional reference to FIG. 6, illustrated are logical operations to implement an exemplary method 100 of regulating a load on an engine-driven electric power generation device in accordance with the present disclosure. Although FIG. 6 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning at step 102, the current provided by the electric power generation device 12 is obtained. The current may be obtained, for example, based on data provided by a current measurement device coupled to an output of the power generation device 12. Data obtained from the current measurement device then can be provided to the controller 28 via a controller input. To further enhance system performance, the measured current may be used to calculate an average current over a predetermined time period. Preferably, the average is a running average.

Next at step 104 the average current is used to generate high and low thresholds for controlling power flow in the bus conditioner. For example, the high and low thresholds may be set at a predetermined percentage over and under the calculated average current. Use of the threshold is discussed below with respect to steps 110 and 116.

At step 106, the load current on the bus is obtained. Such load current may be obtained, for example, by using a current measuring device to measure the current provided to each load and then summing the individual currents for each load to arrive at a total load current on the system. At step 108 the total load current is divided into high frequency components and low frequency components. For example, the controller 28 may compare the total load current to predetermined frequency ranges. Any component of the total load current that is below a prescribed frequency may be considered a low frequency component, and any component of the total load current that is above the prescribed frequency may be considered a high frequency component. The first prescribed frequency may be preset to 10 Hz, and the second prescribed frequency may be set to 30 Hz.

At step 110, the total load current is compared to the high threshold value obtained at step 104. If the load current is greater than the high threshold value, the method moves to step 112 where power on the bus 16 corresponding to the excess low frequency component is used by the power converter 26 to charge the first ESD 24a. At step 114, power on the bus 16 corresponding to the excess high frequency component is used by the power converter 26 to charge the second ESD 24b, and the method then moves back to step 102 and repeats.

Moving back to step 110, if the load current is not greater than the high threshold value, the method moves to step 116 where the load current is compared to the low threshold value obtained at step 104. If the total load current is not less than the low threshold value, the method moves back to step 102 and repeats. However, if the total load current is less than the low threshold value, then at step 118 energy stored in the first ESD 24a is used by the power converter 26 to provide a low frequency power component to the bus 16, and at step 120 energy stored in the second ESD 24b is used by the power converter 26 to provide a high frequency power component to the bus. After step 120 is completed, the method moves back to step 102 and repeats.

Figure 7:
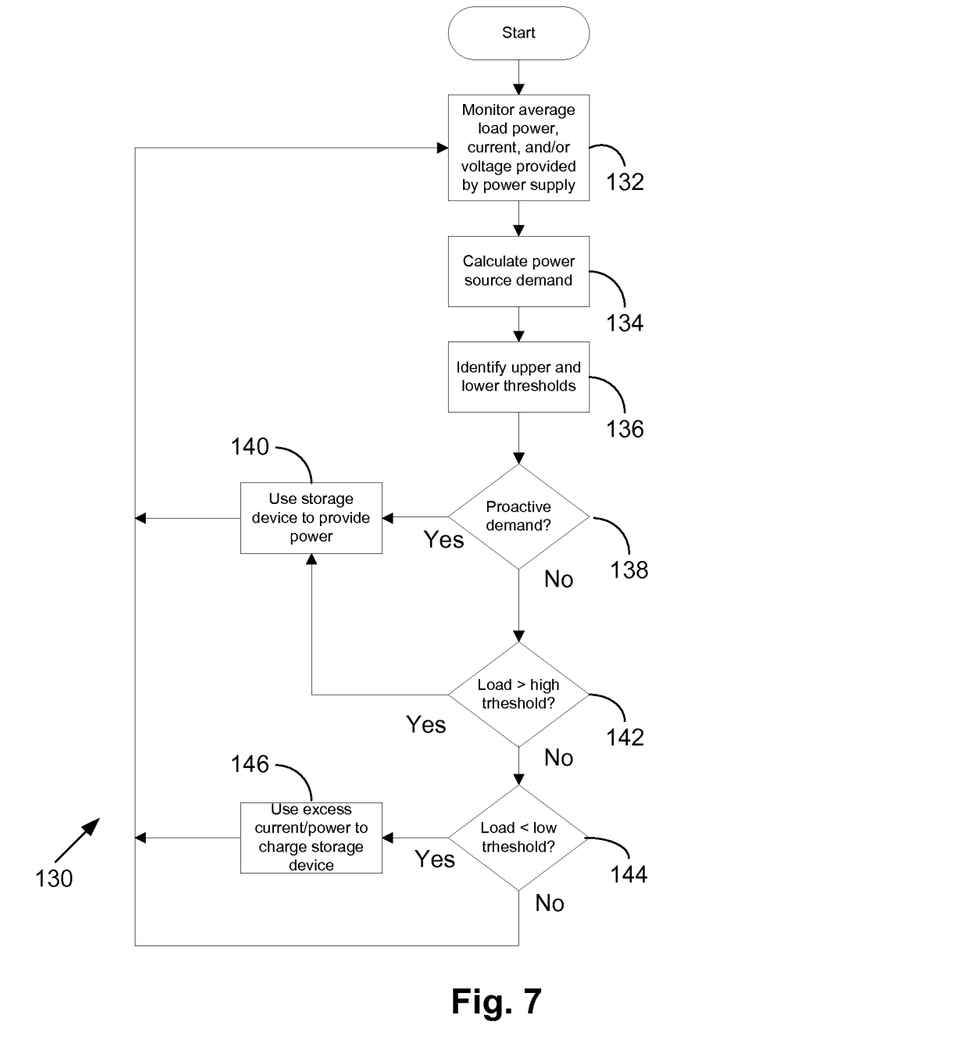
FIG. 7 is a flow chart illustrating exemplary steps for carrying out a method in accordance with another embodiment of the present disclosure.

Moving now to FIG. 7, illustrated is another embodiment of a method 130 in accordance with the present disclosure. Beginning at step 132, the average load power, current and/or voltage provided by the power supply is obtained. The power, current and/or voltage may be obtained, for example, based on data provided by a measurement device (e.g., a power, current or voltage sensor) coupled to an output of the power generation device 12. Data obtained from the measurement device then can be provided to the controller 28 via a controller input. To further enhance system performance, the measured power, current and/or voltage may be used to calculate an average power, current and/or voltage over a predetermined time period.

Next at step 134 the demand placed on the power source is calculated. Such demand may be calculated, for example, based on the actual load on the power source as well as any load known to be added or removed from the bus. Also calculated are the upper and lower power, current and/or voltage thresholds, as indicated at step 136. The upper and lower thresholds, for example, may be set at a predetermined percentage over and under the respective calculated average values.

Moving to step 138, it is determined if power should be proactively adjusted. For example, it may be known that certain equipment (e.g., flaps, landing gear, etc.) will be energized and/or de-energized. Based on such knowledge, it can be determined prior to the equipment actually needing such power if (and how much) additional power should be provided to the bus. If additional power may be needed, then the method can move to step 140 where the energy storage device 24 is used to provide the additional power. Upon providing the additional power, the method may move back to step 132.

Moving back to step 138, if power need not be proactively adjusted, then the method moves to step 142 where the total load power, current and/or voltage is compared to the respective high threshold value obtained at step 136. If the load power, current and/or voltage is greater than the respective high threshold value, then additional power is needed and the method moves to step 140 where the energy storage device 24 is used to provide power to the bus. The method then moves back to step 132.

Moving back to step 142, if the load power, current and/or voltage is not greater than the respective high threshold value, the method moves to step 144 where the load power, current and/or voltage is compared to the respective low threshold value obtained at step 136. If the total load power, current and/or voltage is not less than the respective low threshold value, the method moves back to step 132 and repeats. However, if the total load power, current and/or voltage is less than the respective low threshold value, then excess power is being generated and the method moves to step 146 where the excess power is used to charge the storage device 24. The method them moves back to step 132 and repeats.

While inventive aspects in accordance with the present disclosure have been described in the context of aircraft power systems, including power distribution, power control and power conversion, it should be appreciated that aspects in accordance with the present disclosure can be applied to other power systems. For example, the inventive aspects in accordance with the present disclosure may be applied to power systems in other vehicles, including ships, submarines and the like.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A bus conditioner for an electrical power system having at least one bus couplable to an electric power generation device driven by a prime mover, comprising:
    a first energy storage device;
    a bi-directional power converter including a first converter input electrically connected to the first energy storage device and a converter output for connection to the bus; and
    a controller operatively coupled to the power converter, the controller including logic that maintains a substantially non-varying load on the power generation device by commanding the power converter to divert excess power into the first energy storage device or use energy from the first storage device to provide power to the bus, wherein the logic that maintains a substantially non-varying load includes logic that
    determines a load on the bus,
    commands the power converter to provide energy to the bus upon the determined load being greater than a first prescribed value, and
    commands the power converter to absorb energy into the first energy storage device upon the determined load being less than a second prescribed value.

2. The bus conditioner according to claim 1, wherein the first energy storage device comprises a battery.

3. The bus conditioner according to claim 2, wherein the battery comprises a lithium-ion battery.

4. The bus conditioner according to claim 1, wherein the power converter further comprises:
    a second converter input for connection to a second energy source; and
    a second energy storage device electrically connected to the second converter input.

5. The bus conditioner according to claim 4, wherein the controller includes logic that commands the power converter to use energy stored in at least one of the first or second energy storage devices to provide power to the at least one bus or use power on the bus to store energy in at least one of the first or second energy storage devices.

6. The bus conditioner according to claim 4, wherein the second energy storage device comprises a capacitor.

7. The bus conditioner according to claim 6, wherein the capacitor comprises an electrochemical capacitor.

8. The bus conditioner according to claim 1, wherein the controller includes a first input for receiving a bus voltage, a second input for receiving a bus current, and a third input for receiving a reference power setpoint.

9. The bus conditioner according to claim 8, wherein the controller includes logic that regulates a power level on the bus based on a bus voltage, a bus current and a power reference as provided on the first input, second input and third input, respectively.

10. The bus conditioner according to claim 1, wherein the controller includes logic that calculates a load on the bus based on the bus voltage and bus current, and when the calculated load is less than a first prescribed level the logic diverts power from the bus into at least one of the first energy storage device or the second energy storage device.

11. The bus conditioner according to claim 1, wherein the controller includes logic that calculates a load on the bus based on the bus voltage and bus current, and when the calculated load is greater than a second prescribed level the logic uses energy stored at least one of the first energy storage device or the second energy storage device to provide power to the bus.

12. The bus conditioner according to claim 1, wherein the controller includes logic that:
    determines a load on the bus;
    commands the power converter to provide energy to the bus upon the determined load being greater than a first prescribed value; and
    commands the power converter to absorb energy into at least one of the first or second energy storage devices upon the determined load being less than a second prescribed value.

13. The bus conditioner according to claim 1, wherein the controller includes logic that:
    calculates an average power delivered by the bus; and
    commands the power converter to regulate power, current, or voltage-based load variations on the bus based on the calculated average power.

14. The bus conditioner according to claim 1, wherein the controller includes logic that proactively releases energy to the bus prior to an impending load increase.

15. The bus conditioner according to claim 1, further comprising:
    an aircraft power system, comprising:
    an electrical generator configured to generate DC power;
    at least one distribution device electrically connected to the electrical generator, the distribution device including a first and second terminals electrically connected to the electrical generator, wherein the bus conditioner is electrically connected to the first and second terminals.

16. A method of improving engine efficiency for an engine drivably coupled to an electric power generation device, the method comprising maintaining a substantially non-varying load on the power generation device by providing, via a bi-directional power converter including a converter input electrically connected to a first energy storage device and a converter output electrically connected to a bus, energy from the first energy storage device to the bus or storing energy from the bus in the first energy storage device, wherein said maintaining includes determining a load on the bus,
commanding the power converter to provide energy to the bus upon the determined load being greater than a first prescribed value, and
commanding the power converter to absorb energy into the first energy storage device upon the determined load being less than a second prescribed value.

17. The method according to claim 16, wherein maintaining includes calculating at least one of a current setpoint or a voltage setpoint for determining when to provide energy to the bus and when to store energy from the bus, the current setpoint based on an average current provided by the electric power generation device to the bus over a predetermined time period, and the voltage setpoint based on an average voltage provided by the electric power generation device to the bus over the predetermined time period.

18. The method according to claim 16, wherein maintaining a substantially non-varying load includes using a first energy storage device and a second energy storage device different from the first energy storage device, the first energy storage device having a higher energy storage density than the second energy storage device, and the second energy storage device having a higher power density than the first energy storage device.

19. A method of improving efficiency for a power source operatively coupled to an electric power generation device, the method comprising maintaining a substantially non-varying load on the power generation device by providing, via a bi-directional power converter including a converter input electrically connected to a first energy storage device and a converter output electrically connected to a bus, energy from the first energy storage device to the bus or storing energy from the bus in the first energy storage device, wherein said maintaining includes determining a load on the bus,
commanding the power converter to provide energy to the bus upon the determined load being greater than a first prescribed value, and
commanding the power converter to absorb energy into the first energy storage device upon the determined load being less than a second prescribed value.

* * * * *